Aug. 31, 1954

P. E. HEAL 2,687,574

GAUGE

Filed Nov. 19, 1949

INVENTOR.
PAUL E. HEAL
BY Edward H. Lang
ATTORNEY

Patented Aug. 31, 1954

2,687,574

UNITED STATES PATENT OFFICE 2,687,574

GAUGE

Paul E. Heal, Chicago, Ill., assignor to The Pure Oil Company, Chicago, Ill., a corporation of Ohio Application November 19, 1949, Serial No. 128,445

4 Claims. (Cl. 33—169)

This invention relates to a tire tread gauge for rubber tires and, in particular, to a tread depth measuring gauge for use in determining the extent and amount of wear of treads of automobile tires.

The most economical and efficient use of the rubber tires on an automobile calls for continuous observation of the amount of tread left on the tires so that rotation thereof at appropriate intervals can be made, and also so that replacement can be made before a substantial danger has developed. That is to say, when a tire has lost about half its tread through wear, it is no longer efficient in operation in that the force with which it grips the ground is reduced and ineffective braking develops. Also, when this condition becomes pronounced, the dangers inherent in such inefficient operation are considerable.

It is, accordingly, a fundamental object of the invention to provide a simple gauge which can be used in routine car inspection to determine the height of the treads on an automobile tire.

It is a second object of the invention to provide a single unitary tool which can be used to measure the height of the treads on a tire in a quick operation, and further used to make a permanent record thereof.

It is another object of the invention to provide a device for measuring the height of tire treads so that routine inspection can be carried out quickly by a serivce station attendant to determine the extent of wear between inspections.

Other objects and advantages of the invention will in part be obvious and in part appear hereinafter.

The invention, accordingly, comprises a gauge having a body portion preferably with an arcuate periphery mounting a plurality of sliding measuring gauge pins placed in known relationship with a series of measuring indicia set at fixed distances from the periphery of the body. The invention thus embodies a tire tread gauge having these features, and the additional elements of construction and arrangement of parts to be hereinafter described.

Referring now to the drawing for a more detailed description of the invention:

Figure 1:
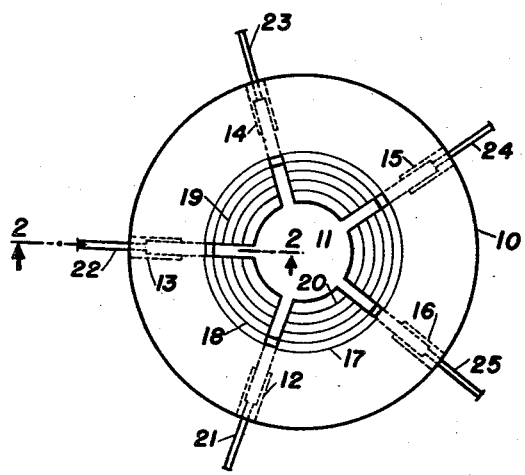
Figure 1 is a plan view of a preferred embodiment of the device showing a circular body and a plurality of measuring pins mounted therein.
Figure 2:
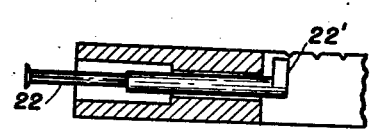
Figure 2 is a section taken along line 2—2 of Figure 1.

In Figure 1, 10 represents the body portion of the device which, in this embodiment, is circular, 11 is a central opening, and 12, 13, 14, 15 and 16 are radially placed passages terminating at the periphery of the body and in radial slots in the body leading to the central opening 11. Those slots are normally of a length corresponding to the depth of the tread on a new tire and bracket the measuring indicia which extend over that length. Concentric with the periphery, there is arranged a plurality of measuring circles or indicia 17, 18, 19 and 20, spaced at intervals corresponding to the measuring units to be used. In each of the passages 12, 13, 14, 15 and 16, there are pins 21, 22, 23, 24 and 25, fitted closely into the passages, yet slidable therein. In a preferred form, each of the pins at its outer terminus, adjacent to the periphery of the device, is enlarged slightly in diameter to form a small sharp collar, as shown with pin 22 in detail in Figure 2, the purpose of which will be apparent in the subsequent description. The inner end of the pin may carry a small projection, for example, the end might be peened over, to serve as a catch to use in manipulating the pin in its passage, as shown at 22' on pin 22 in Figure 2. To make it possible for the pin to slide, the passage is made with about its outward half of a larger diameter than its inward half, and the pin with about its outer half with a diameter reduced as shown in the enlarged sectional view in Figure 2.

Figure 3:
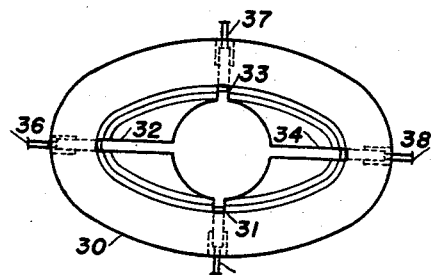
Figure 3 is a plan view of a second embodiment of the apparatus.
Figure 4:
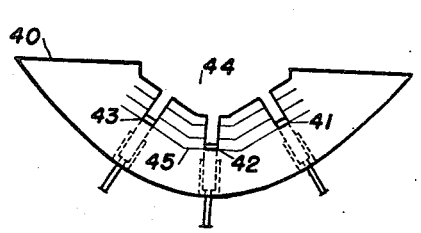
Figure 4 is an embodiment of still another form of the apparatus.

It will be apparent from an examination of the embodiments shown in Figures 3 and 4 that the arcuate periphery need not be a circle, but it can be any conic section, as shown by the elliptical periphery in Figure 3, and the parabolic one in Figure 4. The preferred construction and arrangement of pins is such that the pin emerges substantially normal to a tangent to the arcuate circumference of the device at the point of emergence.

In Figure 3, the elliptical body 30, has axially placed passages 31, 32, 33 and 34, carrying pins 35, 36, 37 and 38. Measuring indicia 39 are ellipses having the same ratio of major to minor axis as the body so that axial movement of pins can be measured on the scale. Though elliptical measuring indicia have been shown, it is apparent that circular could be used, for the only adjustment that would be required would be in the length of the pin.

Figure 4 illustrates the measuring device having a parabolic outline with a body 40, passages 41, 42, and 43, terminating in opening 44. The passages carry slidable pins running between the edge of the body and open slots terminating at the center opening of the device. Measuring indicia 45 are bracketed by the slots in the body of the piece.

Though in the several embodiments shown in the figure, measuring indicia have been shown on the body of the piece, it should be apparent that an effective measurement could be made by placing the said indicia on the probes, for that to be measured is relative movement between the probe and the gauging edge and the scale placed on the body or the probe to give a measurement thereof.

From these several illustrations, it will be seen that the gauge comprises a body carrying a plurality of depth probes arranged to read on a common scale, the probes being also set at acute angles to each other so that a plurality of measurements, one for each tire, can be made in a single pass around an automobile. Though the measuring body having an arcuate periphery has been described as a preferred form, it will be apparent that a body having the form of a polygon or sphere will serve for the essential mounting of a plurality of measuring probes with respect to the measuring edge and a scale of measuring indicia can thereby be maintained. Friction between the probe and its passage holds it in place upon making a measurement.

Figure 5:
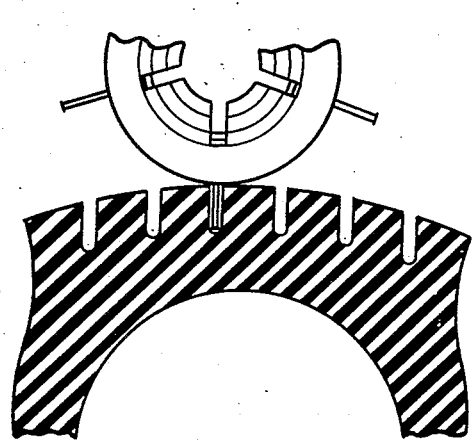
Figure 5 is an illustration of how a tread measurement is made.

Referring now to Figure 5, wherein there is shown an embodiment of the device described in connection with Figure 1, and a cross section through a tire to illustrate the manner of using the device, it will appear that for use, the pins are pushed from their passages so that the top end of the pin coincides with the outer measuring index. By proper dimensioning of the pins and body piece, the amount of pin projecting beyond the periphery of the body will coincide with the depth of a new tire tread. At this point, the pin is inserted into a tire tread or groove, and the device pressed down until the periphery of the gauge becomes tangent to the tire tread. Thus, the end of the pin will have been returned toward the center by an amount determined by the portion of the tire tread which has been lost through wear. Actually, where the measurements are to be made over a series of intervals, it is not essential that the first measurement correspond to that made on a new tire as long as a record is kept of what that measurement was. The process of making successive measurements on tires at successive intervals will give a continuous record showing the decrements in the height of the tread on the tire. It will be apparent to a tire owner after a period of time when he has lost a dangerous fraction of the tire tread.

Figure 6:
Figure 6 is an illustration of how a record can be conveniently made of the measurement.

For record keeping purposes, the diagram shown in Figure 6 will illustrate how the several measurements made with the several pins on the gauge can be recorded for the benefit of the tire owner and the service station operator. A carbon paper 60 carrying blacking on both sides is inserted between two sheets 61 and 62 in a pad, and, using the edge of the pad as a guide, the outwardly extending pin 63, which represents the depth of a tread, with its enlarged collar is used to make a mark on the sheet, which mark by virtue of the two-sided carbon is recorded on both the upper and lower sheets. In this manner, identification of the tire, the tread measured, and the periodic reporting of conditions to an owner, gives a permanent record as well as an indication of the condition of the tires.

Though the invention has been described with only a few embodiments, it will be recognized they illustrate the principle thereof, rather than limit its application.

What is claimed is:

1. A gauge for measuring the depth of grooves comprising, a body having a plurality of gauging edges, a plurality of independently manipulable probes slidably mounted in said body in non-interferant relationship to each other on axes normal to, extending past and cooperating with said gauging edges, said probes being set in said body at acute angles with each other, indicia on said body to form measuring scales having substantially continuous divisions common to and coacting with each of said probes, said probes being slidable in said body in amount at least equal to the length of said scales, and at least equal to the depth of the groove to be measured and frictionally engaged by said body to maintain a semi-fixed relation thereto.

2. An apparatus in accordance with claim 1 in which the body is circular and carries a plurality of radially mounted pins, said indicia comprising a series of concentric rings.

3. An automobile tire tread gauge comprising, a body having a gauging edge consisting of a conic section, passages in said body substantially normal to the gauging edge, and independently manipulable probes slidable in said passages and extendable past said gauging edge at least in an amount equal to the depth of the groove to be measured, said probes being frictionally engaged by the side walls of said passages to maintain a semi-fixed relation thereto, indicia on said body common to and coacting with said probes and corresponding in form to the conic section outlining said body inscribed thereon to be coincident throughout to form a measuring scale having substantially continuous divisions in fixed relation thereto.

4. An apparatus according to claim 3 in which the probes are formed with a flared, sharp edged external tip.

References Cited in the file of this patent

UNITED STATES PATENTS

| Number | Name | Date |
|---|---|---|
| 854,333 | Cousino | May 21, 1907 |
| 941,297 | Barthelmes | Nov. 23, 1909 |
| 1,135,089 | Wilks | Apr. 13, 1915 |
| 1,272,729 | Towsley | July 16, 1918 |
| 1,336,311 | Martin | Apr. 6, 1920 |
| 1,403,156 | Gonzales | Jan. 10, 1922 |
| 1,601,407 | Murray | Sept. 28, 1926 |
| 1,660,369 | Basick | Feb. 28, 1928 |
| 2,136,675 | Danse | Nov. 15, 1938 |
| 2,161,704 | Noster | June 6, 1939 |
| 2,311,804 | Wright | Feb. 23, 1943 |
| 2,314,149 | Lipscomb | Mar. 16, 1943 |
| 2,400,371 | Reeser | May 14, 1946 |
| 2,550,508 | Wiedemer | Apr. 24, 1951 |
| 2,551,471 | Snow | May 1, 1951 |

FOREIGN PATENTS

| Number | Country | Date |
|---|---|---|
| 398,178 | Great Britain | Sept. 6, 1933 |